(12) United States Patent
Carroll

(10) Patent No.: US 8,083,293 B2
(45) Date of Patent: Dec. 27, 2011

(54) EMPTY/LOAD BRAKE CONTROL DEVICE WITH MULTI-STAGE SENSING

(75) Inventor: John B. Carroll, Irwin, PA (US)

(73) Assignee: Wabtec Holding Corp., Wilmerding, PA (US)

( * ) Notice: Subject to any disclaimer, the term of this patent is extended or adjusted under 35 U.S.C. 154(b) by 243 days.

(21) Appl. No.: 12/463,627

(22) Filed: May 11, 2009

(65) Prior Publication Data

US 2010/0283316 A1 Nov. 11, 2010

(51) Int. Cl.
*B60T 8/18* (2006.01)

(52) U.S. Cl. ........................... 303/22.2; 303/22.7

(58) Field of Classification Search ......... 303/22.2–22.7
See application file for complete search history.

(56) References Cited

U.S. PATENT DOCUMENTS

| | | | |
|---|---|---|---|
| 2,068,342 A | 1/1937 | McClure | |
| 2,854,288 A * | 9/1958 | Thomas | 303/22.6 |
| 3,169,801 A * | 2/1965 | Racki | 303/22.6 |
| 3,376,080 A | 4/1968 | Kettering et al. | |
| 3,671,086 A | 6/1972 | Scott | |
| 4,080,005 A | 3/1978 | Engle | |
| 4,235,477 A | 11/1980 | Hart | |
| 4,235,478 A | 11/1980 | Billeter | |
| 4,291,923 A | 9/1981 | Billeter | |
| 4,364,609 A | 12/1982 | Wickham | |
| 4,417,767 A | 11/1983 | Billeter | |
| 4,423,909 A * | 1/1984 | Page et al. | 303/22.2 |
| 4,583,790 A | 4/1986 | Scott | |
| 4,714,297 A | 12/1987 | Vaughn | |
| 4,801,179 A | 1/1989 | Hintner | |
| 4,844,554 A | 7/1989 | Rojecki | |
| 5,005,915 A * | 4/1991 | Hart et al. | 303/22.2 |
| 5,100,207 A | 3/1992 | McKay | |
| 5,106,168 A * | 4/1992 | McKay | 303/22.2 |
| 5,269,595 A | 12/1993 | McKay et al. | |
| 5,303,987 A * | 4/1994 | McKay | 303/22.2 |
| 5,340,203 A | 8/1994 | Gowda | |
| 5,346,291 A | 9/1994 | Marsh et al. | |
| 5,662,391 A | 9/1997 | McKay | |
| 6,089,262 A | 7/2000 | Hart | |
| 6,206,483 B1 | 3/2001 | LaLone | |
| 6,305,756 B1 | 10/2001 | Scott et al. | |
| 6,971,723 B2 | 12/2005 | Engle et al. | |
| 2006/0028062 A1 | 2/2006 | Veltri et al. | |

OTHER PUBLICATIONS

WABTEC Corporation, "S-1 Load Sensor Valves, Part Nos. 577646-0001, 577646-0002, 577646-011, 577646-0012, 665131-0001, 665131-0002, 665131-0011 & 665131-0012", Aug. 2005.

WABTEC Corporation, "S-1 Load Sensor Valves, Part Nos. 577646-0001, 577646-0002, 577646-011, 577646-0012, 665131-0001, 665131-0002, 665131-0011 & 665131-0012", Jan. 2005.

(Continued)

*Primary Examiner* — Christopher Schwartz
(74) *Attorney, Agent, or Firm* — The Webb Law Firm

(57) ABSTRACT

An empty/load valve brake control device for a railway vehicle includes a body and a valve member disposed within the body. The body defines an inlet passageway, an outlet passageway, an exhaust passageway, and a secondary passageway. The valve member has an empty position, a load position, and a partial load position. The inlet passageway is connected to the outlet passageway when the valve member is in the empty position, the outlet passageway is connected to the exhaust passageway when the valve member is in the load position, and the inlet passageway is connected to the secondary passageway when the valve member is in the partial load position.

20 Claims, 6 Drawing Sheets

OTHER PUBLICATIONS

Westinghouse Air Brake Division, "AB Single Capacity Freight Car Air Brake Equipment with the ABDX Type Control Valve", Aug. 1991.

Westinghouse Air Brake Division, ""P-1" Load Proportional Valve", Apr. 1987.

* cited by examiner

EMPTY/LOAD BRAKE CONTROL DEVICE WITH MULTI-STAGE SENSING

BACKGROUND OF THE INVENTION

1. Field of the Invention

The present invention relates to an empty/load brake control device for a railway freight car and, more particularly, to a multi-stage sensing valve device to adjust the degree of brake application in accordance with load conditions of a railway freight vehicle.

2. Description of Related Art

Brake equipment for railway freight cars typically employs dual capacity empty/load equipment which adjusts the brake application force according to the empty or loaded conditions of the freight car. In such dual capacity empty/load equipment, a two-setting control is provided where normal brake pressure is realized under full load conditions and a reduced or modulated brake pressure is realized under an empty load condition. In contrast, single capacity brake equipment, which produces a brake application force independent from the load condition of the car loading, is susceptible to wheel lock and sliding wheels due to the same brake force being applied to an empty car as a loaded car. Sliding wheels undesirably cause flat spots on the wheels as well as decreased brake performance. By modulating the brake pressure under empty load conditions using dual capacity empty/load equipment, the occurrence of sliding wheels is reduced or eliminated. The changeover point between the empty and load settings is selected at a predetermined car weight, such as 20% of the full load capacity weight. When freight cars are either fully loaded or completely empty, the dual capacity empty/load equipment generally functions acceptably. However, with varying load conditions, i.e., loads that are intermediate a fully loaded and an empty condition, dual capacity empty/load type brake equipment may not be satisfactory as cars having a partial load may be under-braked or over-braked depending on the pre-selected changeover point between the empty and load settings.

U.S. Pat. No. 3,671,086 to Scott discloses a dual capacity empty/load changeover device having a load-sensing mechanism and a proportional valve. The load-sensing mechanism has a two-position spool-type valve having a first position connecting an inlet to the proportional valve and a second position connecting the inlet to atmosphere. A load-sensing arm pivots into contact with an un-sprung part of the car to position the spool valve in the first position while the car is empty and in the second position when the car is loaded. In particular, when the freight car is loaded, the load-sensing arm will contact a portion of the car to limit the travel of the load-sensing arm as well as the spool valve. When the car is empty, the spool valve will be in the first position to activate the proportional valve which modulates the brake application force applied to the wheels. The foregoing Scott patent is incorporated herein by reference.

SUMMARY OF THE INVENTION

Pursuant to one embodiment, an empty/load valve brake control device for a railway vehicle includes a body and a valve member disposed within the body. The body defines an inlet passageway, an outlet passageway, an exhaust passageway, and a secondary passageway. The valve member has an empty position, a load position, and a partial load position. The inlet passageway is connected to the outlet passageway when the valve member is in the empty position, the outlet passageway is connected to the exhaust passageway when the valve member is in the load position, and the inlet passageway is connected to the secondary passageway when the valve member is in the partial load position.

The valve member may be operatively connected to a sensing arm that is pivotal relative to the housing. Further, the empty position, the load position, and the partial load position of the valve member may be determined by a pivoted position of the sensing arm. The outlet passageway may be connected to the secondary passageway when the valve member is in the partial load position via a check valve positioned within a valve chamber. The valve chamber is connected to the secondary passageway and the outlet passageway. The valve chamber may be connected to the outlet passageway via a connecting passageway.

The check valve may include a valve element, a valve seat, and a valve spring. The valve seat is positioned adjacent the secondary passageway and has a seated position with the valve element engaged with the valve seat and an open position with the valve element spaced from the valve seat. The valve element in the open position provides a flow path from the secondary passageway to the outlet passageway.

Pursuant to another embodiment, an empty/load brake control device for a railway vehicle includes a body, a valve member disposed within the body, a piston assembly disposed within the body and secured to the valve member, a push rod secured to the piston assembly, and a sensing arm secured to the body and the push rod. The body defines an inlet passageway, an outlet passageway, an exhaust passageway, and a secondary passageway. The valve member is displaceable between an empty position, a load position, and a partial load position. The piston assembly and the push rod are displaceable in a first direction relative to the body. The sensing arm is pivotal relative to the body. The piston assembly actuates the valve member between the load position, the partial load position, and the empty position. The inlet passageway is connected to the outlet passageway when the valve member is in the empty position, the outlet passageway is connected to the exhaust passageway when the valve member is in the load position, and the inlet passageway is connected to the secondary passageway when the valve member is in the partial load position.

Pursuant to a further embodiment, an empty/load brake control device for a railway vehicle includes a body, a spool valve having an empty position, a load position, and a partial load position disposed within the body, a piston assembly disposed within the housing and secured to the valve member, and a check valve positioned within a valve chamber. The body defines an inlet passageway, an outlet passageway, an exhaust passageway, and a secondary passageway. The spool valve has a spool defining a first annular recess, a second annular recess, an opening in a periphery of the spool, and a central passageway. The first annular recess is defined by first and second seals, the second annular recess is defined by the second seal and a third seal, and the opening in the periphery of the spool is connected to the central passageway. The piston assembly and the spool are displaceable in a first direction relative to the body. The valve chamber is connected to the secondary passageway and the outlet passageway. The first annular recess of the spool is connected to the outlet passageway and the exhaust passageway in the load position, the first annular recess of the spool is connected to the inlet passageway and the outlet passageway in the empty position, and the inlet passageway is connected to the secondary passageway via the central passageway of the spool in the partial load position.

Further details and advantages will become clear upon reviewing the following detailed description in conjunction with the accompanying drawings.

DESCRIPTION OF THE PREFERRED EMBODIMENTS

Figure 1:
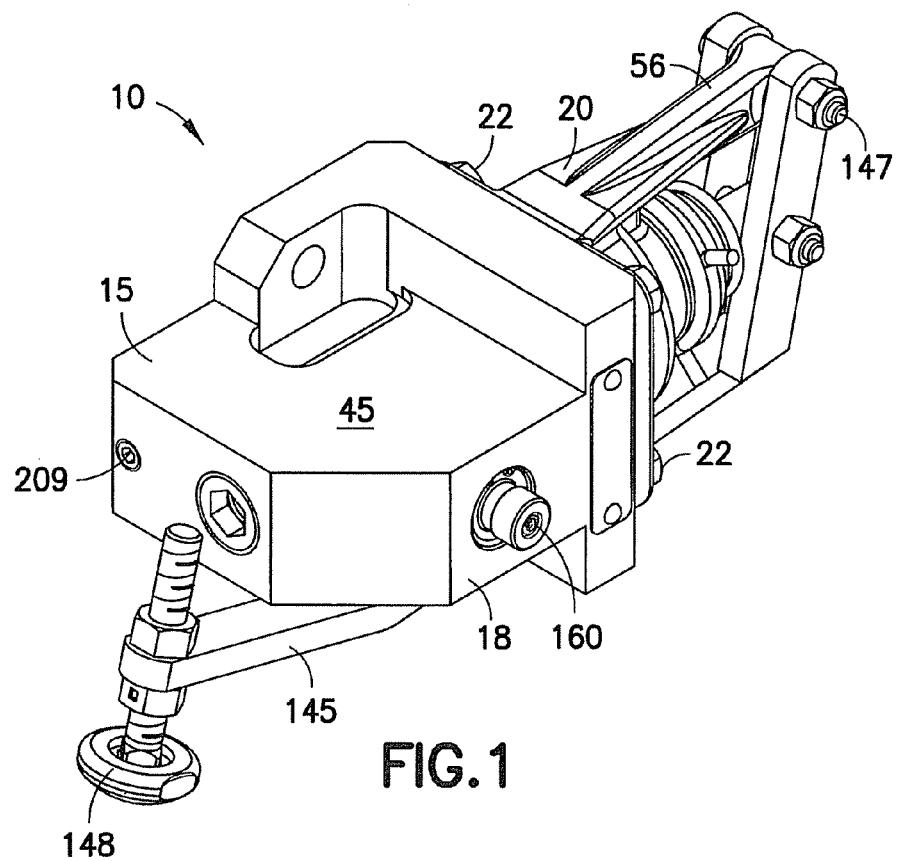
FIG. 1 is a perspective view of an empty/load brake control device according to one embodiment of the present invention.
Figure 2:
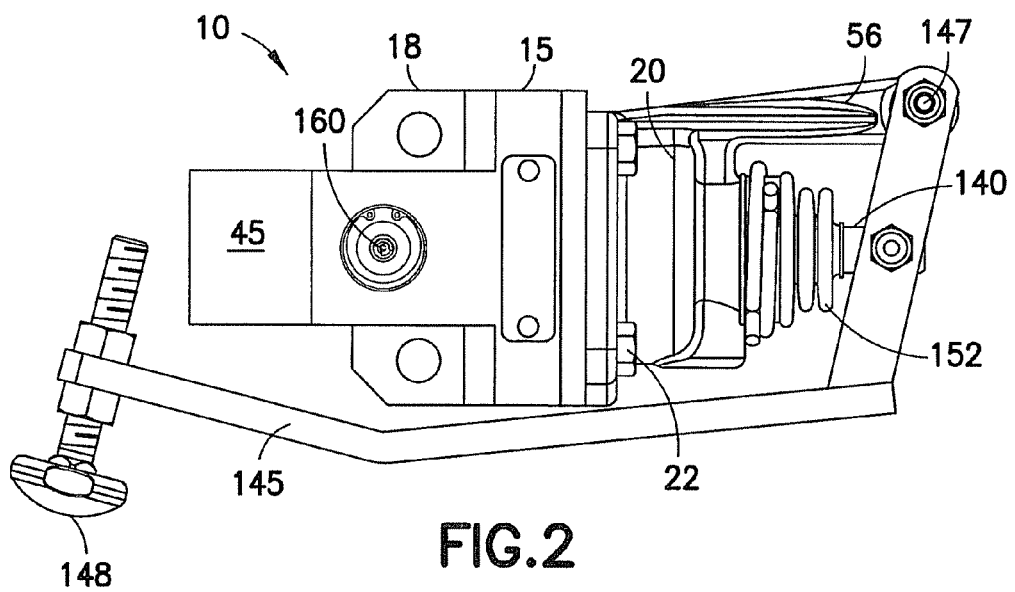
FIG. 2 is a top view of the empty/load brake control device shown in FIG. 1.
Figure 3:
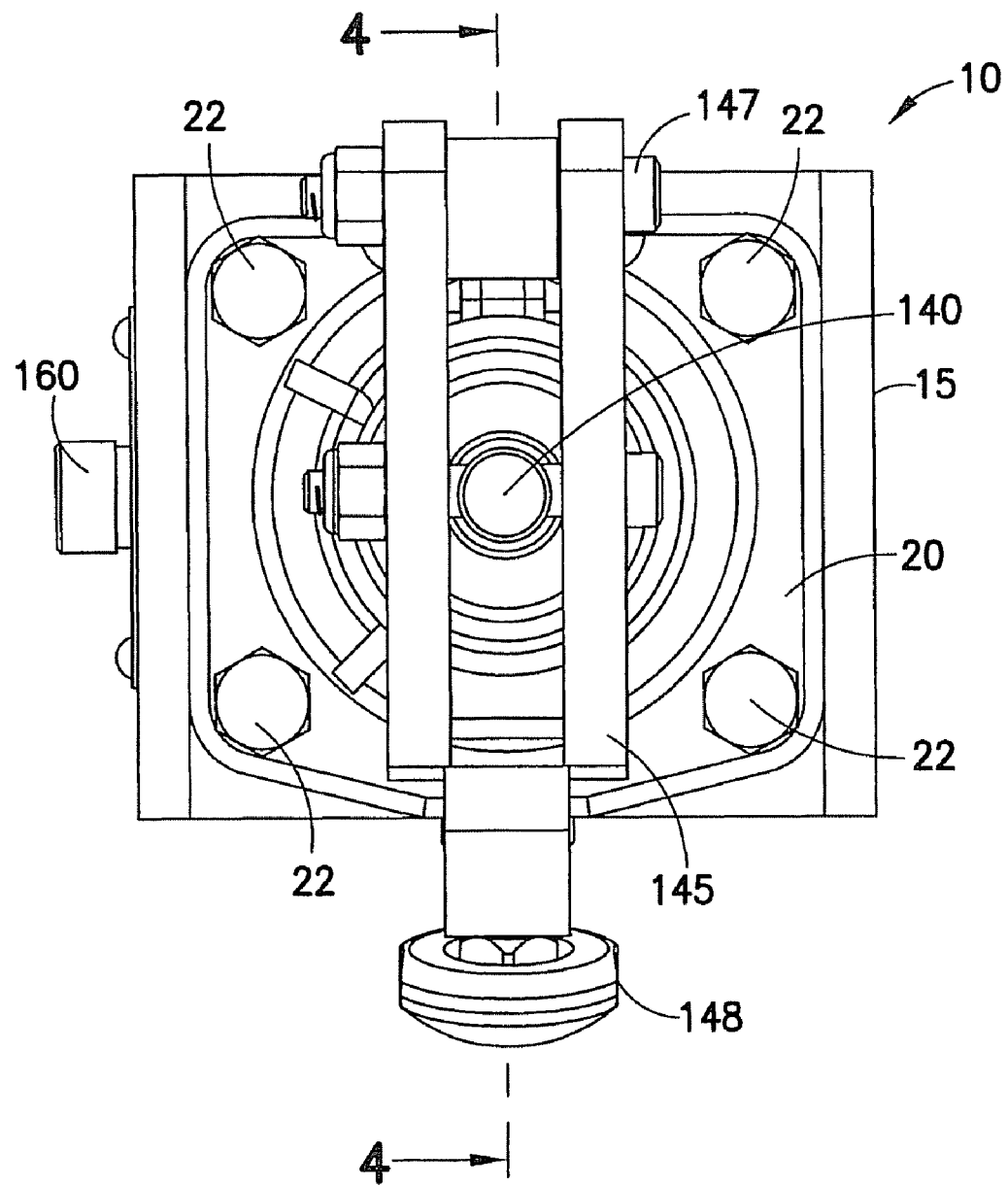
FIG. 3 is a side view of the empty/load brake control device shown in FIG. 1.

For purposes of the description hereinafter, spatial orientation terms, if used, shall relate to the referenced embodiment as it is oriented in the accompanying drawing figures or otherwise described in the following detailed description. However, it is to be understood that the embodiments described hereinafter may assume many alternative variations and embodiments. It is also to be understood that the specific devices illustrated in the accompanying drawing figures and described herein are simply exemplary and should not be considered as limiting.

Referring to FIGS. 1-5, an empty/load brake control device 10 (hereinafter "empty/load device 10") according to one embodiment is shown. The empty/load device 10 includes a body 15 having a first section 18 and second section 20 secured to each other via mechanical fasteners 22, such as bolts. The first section 18 of the body 15 defines a valve bore 25 and first and second coaxial bores 27, 29 of increasing diameter and extending longitudinally toward the second section 20. The first section 18 includes an inlet passageway 35 and an outlet passageway 40 extending radially inwards from an exterior 45 of the body 15. Further, the first section 18 defines an indicator passageway 47, an exhaust passageway 49, and a secondary passageway 51 that are each connected to the valve bore 25.

A spool valve assembly 60 is disposed within the valve bore 25. The spool valve assembly 60 includes an annular bushing 62 with a spool 75 slidingly mounted within the bushing 62 such that the spool 75 is axially displaceable relative to the annular bushing 62. The bushing 62 includes an inlet port 64, an outlet port 66, an indicator port 68, an exhaust port 70, and a secondary port 72 extending in a radial direction through the annular bushing 62. The outlet port 66 is connected to the outlet passageway 40, the indicator port 68 is connected to the indicator passageway 47, the exhaust port 70 is connected to the exhaust passageway 49, and the secondary port 72 is connected to the secondary passage 51. In order to balance the spool valve assembly 60 by subjecting opposite ends to the same pressure, the spool 75 is provided with a central passageway 77 that is open at the right-hand end of the spool 75 and, at the other end, provides an opening 79 at a peripheral surface of a stem 83 that is integral with the left-hand end of the spool 75. The inlet port 64 in the bushing 62 of the spool valve assembly 60, which is adjacent the opening 79 in the peripheral surface of the stem 83, provides a flow path from the inlet 64 to the central passageway 77. The spool 75 includes first and second spaced-apart peripheral annular grooves 85, 87 of unequal length defined by three spaced apart o-ring seals 89, 90, 91 provided within respective seal seats. One of the o-ring seals 90 is provided between the first and second annular grooves 85, 87 with the other o-rings 89, 91 positioned adjacent the ends of the spool 75, respectively. The o-ring seals 89, 90, 91 prevent leakage of fluid under pressure between the surface of the spool 75 and the bushing 62. The stem 83 of the spool 75 is provided with an opening 93 with a pin 95 inserted through the opening 93.

A diaphragm type piston assembly 100 is disposed within the body 15 between the first and second sections 18, 20 of the body. The piston assembly 100 includes a piston 105, a diaphragm 110, and a piston follower 115. The diaphragm 110 is clamped at an outer periphery 112 between the first and second sections 18, 20 of the body 15 and is clamped at an inner periphery 113 between the piston 105 and piston follower 115 to define a vent chamber 125 and an actuating chamber 127. The second section 20 of the body 15 defines a vent 129 extending from the exterior 45 of the body 15 into the vent chamber 125. The piston follower 115, which is secured to the piston 105, includes a hollow body portion 117 having an elongated slot 120 and an o-ring seal 122. The o-ring seal 122 is positioned around the periphery of the hollow body portion 117 and engages a bushing 131 disposed within the first coaxial bore 27 of the first section 18. Opposite ends of the pin 95 positioned within the opening 93 in the stem 83 of the spool 75 extend through the elongated slot 120 of the piston follower 115.

A push rod 140 is secured to the piston assembly 100 and projects through an opening 54 in the second section 20 of the body 15. An extension 56 of the second section 20 of the body 15 pivotally supports a sensor arm 145 to which the push rod 140 is secured to effect rotation of the sensor arm 145 in response to operation of the piston assembly 100 against the resistance of a retracting spring 150 disposed in the vent chamber 125. The sensor arm 145 is secured to the extension 56 via a fastener 147, such as a bolt. Further, the sensor arm 145 includes a ball screw 148 secured to an end of the sensor arm 145 opposite the connection to the extension 56. The retracting spring 150 engages the second section 20 of the body 15 at one end and the piston 105 at the other end. Further, a boot 152 is disposed over the push rod 140 and is clamped to the second section 20 of the body 15 via a clamp ring 154. The boot 152 prevents dirt or other debris from entering the body 15.

Figure 5:
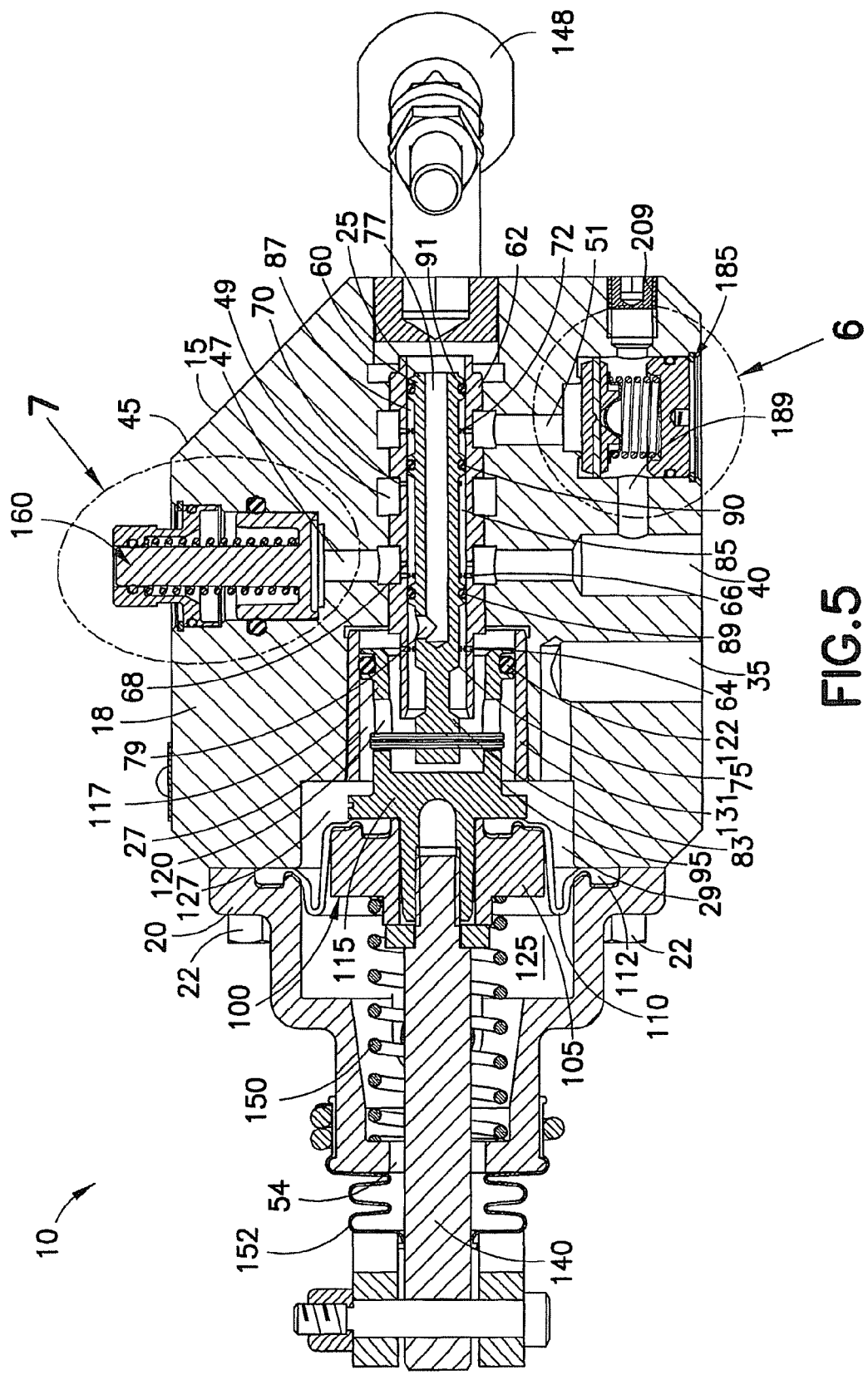
FIG. 5 is a cross-sectional view taken along the line 5-5 in FIG. 4.
Figure 7:
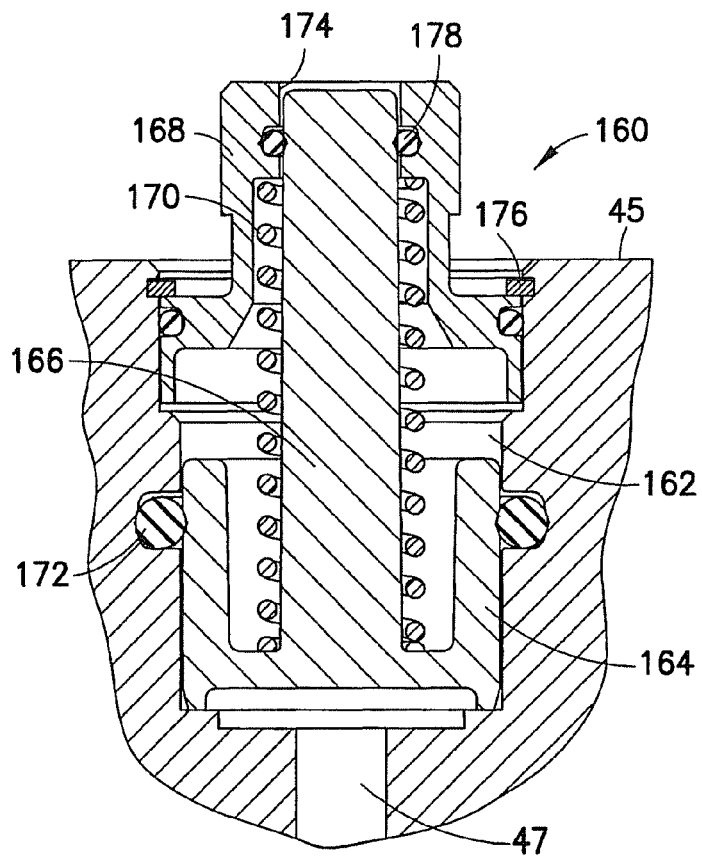
FIG. 7 is a detail view of an indicator shown in FIG. 5.

Referring to FIGS. 5 and 7, an indicator assembly 160 is positioned within an indicator chamber 162 of the first section 18 of the body 15. The indicator chamber 162 is connected to the indicator passageway 47. The indicator assembly 160 includes a piston 164 having an indicator portion 166, a housing 168, and a spring 170. The piston 164 is disposed adjacent to the indicator passageway 47 with an o-ring seal 172 provided between the indicator chamber 162 and the piston 164. The housing 168 is positioned adjacent the exterior 45 of the body 15 and extends beyond the exterior of the body 15. The housing 168 is retained within the indicator chamber 162 via a retainer ring 176. The spring 170 is positioned between the housing 168 and the piston 164 and normally biases the piston 164 to the position shown in FIG. 7. Applying force to the piston 164 causes the piston 164 to be displaced upwardly toward the opening 174 such that the indicator portion 166 of the piston 164 extends beyond an opening 174 in the housing 168. An o-ring seal 178 is also provided between the indicator portion 166 and the housing 168.

Figure 6:
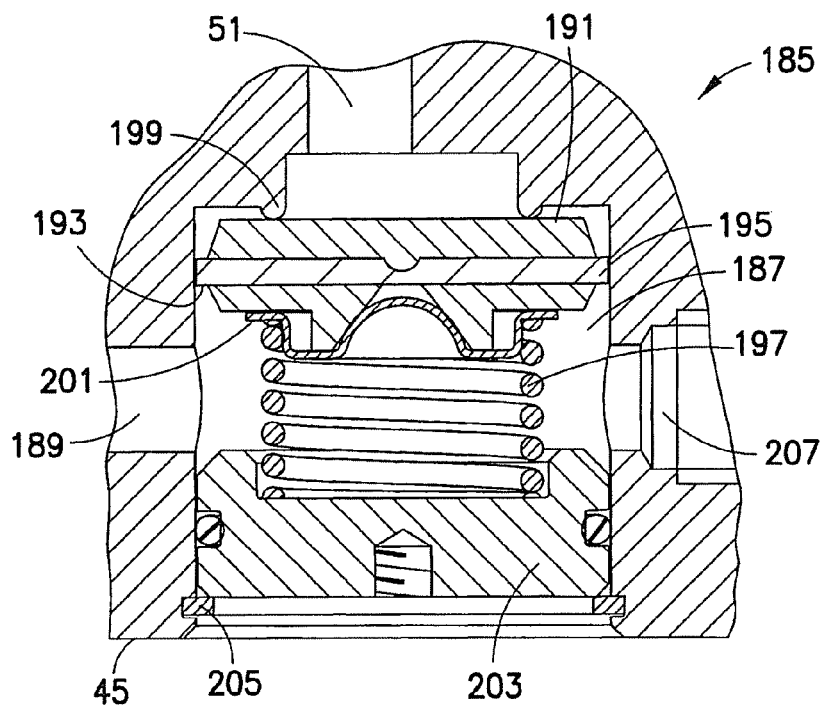
FIG. 6 is a detail view of a check valve shown in FIG. 5.

Referring to FIGS. 5 and 6, a check valve assembly 185 is positioned within a check valve chamber 187 in the first section 18 of the body 15. The check valve chamber 187 is connected to the secondary passageway 51 and is also connected to the outlet passage 40 via a connecting passageway 189. The check valve assembly 185 includes a valve element 191, a valve spring 197, a valve seat 199, a spring seat 201, and a cap 203. The valve element 191 is a disc-shaped body with an insert 193 positioned within the element 191. In particular, the valve element 191 may be constructed of rubber and the insert 193 may be constructed of metal to provide stiffness and strength. The insert 193 includes a plurality of prongs projecting from the periphery of the valve element 191 such that the valve element has a fluted periphery 195. The fluted periphery 195 aids in the flow of air through the check valve 185 and guides the valve within the valve chamber 187. The cap 203 is positioned adjacent the exterior 45 of the body 15 opposite of the valve seat 199 and is secured using a retaining ring 205. The spring seat 201 engages the valve element 191 on a side opposite from the valve seat 199 with the valve spring 197 provided between the spring seat 201 and the cap 203. The valve spring 197 biases the valve element 191 against the valve seat 199 in the closed position of the check valve 185. Further, the check valve chamber 187 is connected to an end passageway 207 that extends to the exterior 45 of the body 15. As shown in FIG. 5, the end passageway 207 includes an end plug 209 that closes off the end passageway 207 from the atmosphere.

The inlet 35 of the empty/load device 10 is typically connected to brake cylinder (not shown) extending from a brake control valve device (not shown) through a proportional valve device (not shown). The brake control valve device may be a conventional ABDX type brake control valve, manufactured by Wabtec Corporation. The outlet 40 of the empty/load device 10 is typically connected to the proportional valve device (not shown). The proportional valve device may be a conventional proportioning valve for empty/load braking equipment such as the "P-1 Load Proportional Valve" device manufactured by Wabtec Corporation. The empty/load device 10 is mounted on a sprung part of the freight car that is movable relative to an un-sprung part of the car such as a side frame of the vehicle truck, although other suitable arrangements may be used.

In order to effect a service brake application, pressure in a brake pipe (not shown) is reduced in the conventional manner which causes the brake control valve device to connect pressurized air from an auxiliary reservoir (not shown) through the proportional valve to the inlet 35 of the empty/load device 10. The inlet 35 is connected to and in fluid communication with the actuating chamber 127 of the empty/load device 10. The actuating chamber 127 is also in fluid communication with both ends of the spool 75 via the first coaxial bore 27, the elongated slot 120 in the piston follower 115, the inlet port 64 in the bushing 62 of the spool valve assembly 60, the opening 79 in the periphery of the spool 75, and the central passageway 77 in the spool 75. Accordingly, the spool valve assembly 60 is balanced such that the spool valve assembly 60 will remain in the position shown in FIG. 5 until the pressure in the actuating chamber 127 moves the diaphragm piston assembly 100 and push rod 140 to the left towards the second section 20 of the body 15 against the biasing force of the retracting spring 150. The movement of the push rod 140 and diaphragm piston assembly 100 against the force of the retracting spring 150 causes the sensor arm 145 to pivot downward about the connection of the arm 145 to the extension 56. The vent chamber 125 of the second section 20 of the body 15 includes a vent 129 to allow air to escape through the vent 129 as the diaphragm piston assembly 100 is displaced into the vent chamber 125.

As the freight car is initially assumed to be empty, the distance between empty/load device 10 and the un-sprung portion of the car will be at a maximum. Continued movement of the diaphragm piston assembly 100 causes the pin 95 in the stem 83 of the spool 75 to move within the elongated slot 120 of the piston follower 115 such that the pin 95 engages the piston follower 115 thereby moving the spool 75 towards the second section 20 of the body 15. The spool 75 will continue to move within the bushing 62 until the ball screw 148 of the sensor arm 145 engages the un-sprung part of the car. As the spool 75 moves leftward toward the second section 20 of the body 15, the o-ring seals 89, 90, 91 move therewith such that the first annular groove 85 in the spool 75 is positioned over the inlet port 64 and the outlet port 66 in the bushing 62 with the o-ring seals 89, 90 defining a flow path from the inlet 35 to the outlet passageway 40. Connecting the inlet 35 to the outlet passageway 40 activates the proportional valve device to proportion the output to a brake cylinder (not shown) with a ratio of typically 40 to 60%. Further, when the spool 75 is moved toward the second section 20 of the body 15 in an empty car condition, the first annular groove 85 in the spool 75 is also positioned over the indicator port 68 such that air enters the indicator chamber 162 forcing the piston 164 towards the indicator housing 168 against the bias of the spring 170. The indicator portion 166 of the piston 164 is extended beyond the housing 168 to provide an indication that the freight car has an empty condition. Upon release of the brake application, the air pressure in the actuating chamber 127 is released and the retracting spring 150 biases the diaphragm piston assembly 100 back to the position shown in FIG. 5. In particular, the elongated slot 120 of the piston follower 115 engages the pin 95 of the spool 75 to push the spool 75 toward the first section 18 of the body 15.

In a loaded condition of the freight car, the load compresses the springs of the vehicle truck such that the sprung part that carries the empty/load device 10 is moved downward from the position occupied while empty a distance proportional to the load carried by the freight car. Thus, the distance from the ball screw 148 of the sensing arm 145 to the un-sprung part of the vehicle will decrease as the load on the sprung part of the car is increased.

When a service brake application is applied as described above, air pressure from the inlet 35 moves the diaphragm piston assembly 100 and push rod 140 towards the second section of the body against the biasing force of the retracting spring 150. The movement of the push rod 140 and diaphragm piston assembly 100 against the force of the retracting spring 150 causes the sensor arm 145 to pivot downward about the connection of the arm 145 to the extension 56. Continued movement of the diaphragm piston assembly 100 causes the pin 95 in the stem 83 of the spool 75 to move within the elongated slot 120 of the piston follower 115 such that the pin 95 engages the opposite side of the elongated slot 120. The length of the elongated slot 120 in the hollow body portion 117 of the piston follower 115 is selected so that when the vehicle is fully loaded, the ball screw 148 of the sensor arm 145 moves into an engaged position with the un-sprung portion of the vehicle at the same moment the pin 95 engages the right side end of the elongated slot 120. As a result, the spool 75 is not moved within the bushing 62 from the position shown in FIG. 5.

Figure 4:
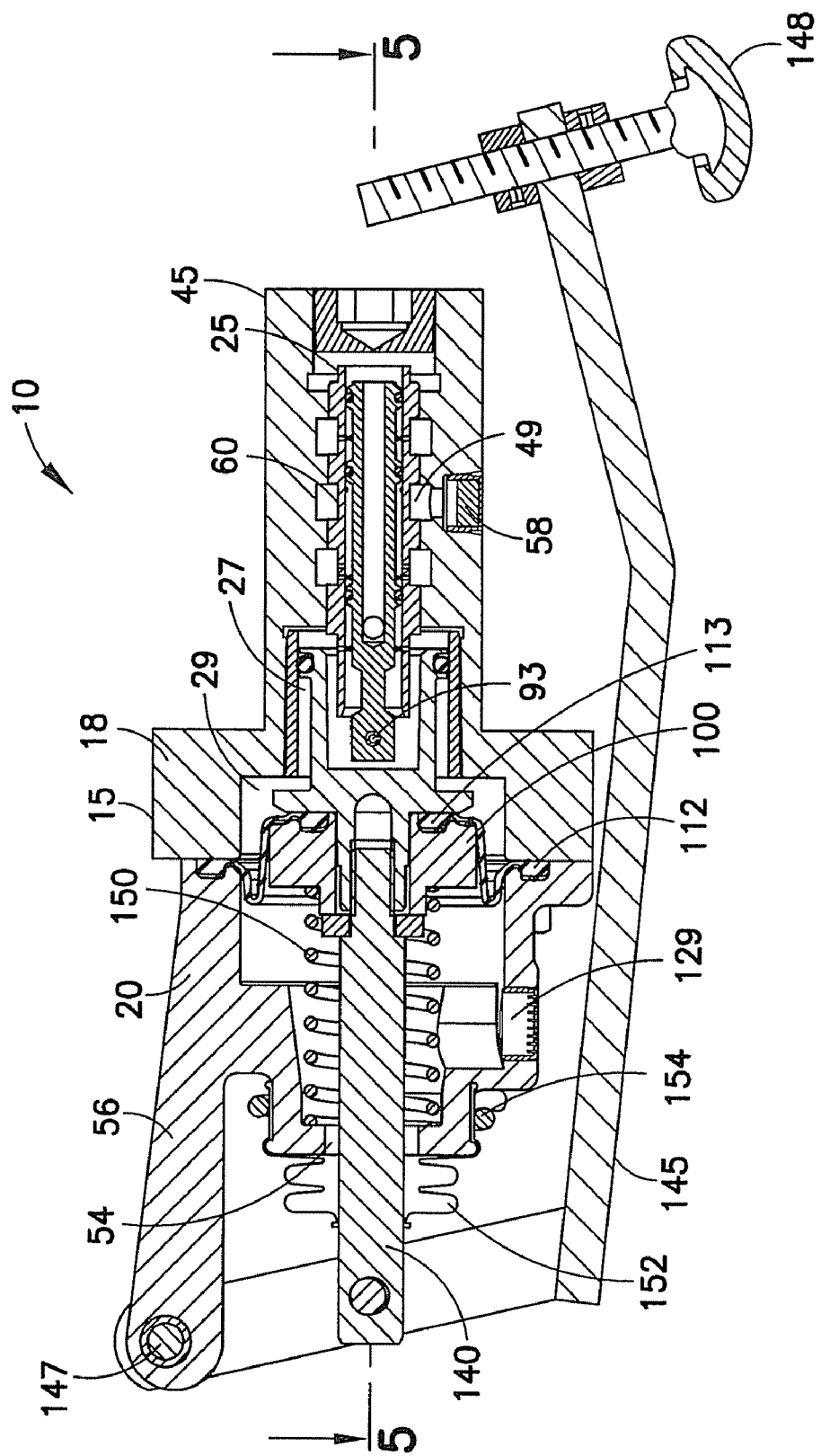
FIG. 4 is a cross-sectional view taken along the line 4-4 in FIG. 3.

When the spool 75 is in the position shown in FIG. 5, the outlet 40 is not connected or in fluid communication with the inlet passageway 35. The first annular recess 85 in the spool 75 is positioned over the outlet port 66 and the exhaust port 70 in the bushing 62 thereby connecting the outlet passageway 40 to the exhaust passageway 49, which is open to atmosphere. As shown in FIG. 4, the exhaust passageway 49 includes an excluder device 58 to prevent the intrusion of debris within the exhaust passageway 49. Consequently, the proportional valve device connected to the outlet 40 is inoperative to proportion the flow of air pressure to the brake cylinder and the air pressure from the brake valve device is directly applied to the brake cylinder without any reduction. Upon release of the brake application, the air pressure in the actuating chamber 127 is reduced and the retracting spring 150 biases the diaphragm piston assembly 100 back to the position shown in FIG. 5.

In a partially loaded condition of the freight car, the load compresses the springs of the vehicle truck such that the sprung part that carries the empty/load device 10 is moved downward as discussed above. Thus, the distance from the ball screw 148 of the sensing arm 145 to the un-sprung part of the vehicle will be intermediate of the distance when the car is in the loaded or empty condition.

When a service brake application is applied as described above, air pressure from the inlet 35 moves the diaphragm piston assembly 100 and push rod 140 towards the second section 20 of the body 15 against the biasing force of the retracting spring 150. As a result, the sensing arm 145 pivots downwardly about the connection of the sensing arm 145 to the extension 56. Continued movement of the diaphragm piston assembly 100 causes the pin 95 in the stem 83 of the spool 75 to move within the elongated slot 120 of the piston follower 115 such that the pin 95 engages the hollow body 117 of the piston follower 115 thereby moving the spool 75 towards the second section 20 of the body 15. The spool 75 will continue to move within the bushing 62 via the engagement of the pin 95 with the piston follower 115 until the ball screw 148 of the sensor arm 145 engages the un-sprung part of the car. More particularly, when the ball screw 148 engages the un-sprung part of the car, the push rod 140, which is connected to the sensor arm 145, is also restricted from further movement thereby restricting the movement of the diaphragm piston assembly 100 that is connected to the push rod 140.

As the spool 75 moves toward the second section 20 of the body 15, the o-ring seals 89, 90, 91 move with the spool 75 such that the first annular groove 85 is moved from the position shown in FIG. 5, which connects the outlet 40 to the exhaust passageway 49, leftward to a position where the outlet 40 is disconnected from the exhaust passageway 49. More specifically, the middle o-ring seal 90 is moved to the left of the exhaust port 70 and the leftmost o-ring seal 89 is moved just to the right of the inlet port 64. The second annular recess 87, which is defined by the middle o-ring seal 90 and the rightmost o-ring seal 91, is moved leftward toward the second section 20 of the body 15 such that the rightmost o-ring seal 91 is positioned to the left of the secondary port 72. The length of the elongated slot 120 in the hollow body 117 of the piston follower 115 is selected such that the ball screw 148 of the sensor arm 145 engages the un-sprung part of the car just as the rightmost seal 91 moves past the secondary port 72. Accordingly, the inlet passageway 35 is connected to the secondary passageway 51 via the first coaxial bore 27, the elongated slot 120 in the piston follower 115, the inlet port 64 in the bushing 62 of the spool valve assembly 60, the opening 79 in the periphery of the spool 75, and the central passageway 77 in the spool 75.

As discussed previously, the check valve 185 is positioned within the check valve chamber 187 between the secondary passageway 51 and the outlet passageway 40. In the assumed partially loaded condition of the car, the air from the inlet 35 causes a pressure to be applied to the valve element 191 of the check valve 185 against the biasing force of the valve spring 197. The check valve 185 is designed to open from the seated position shown in FIG. 6 when a predetermined force from the air pressure acts upon the valve element 191. For instance, the check valve 185 may be designed to open when a pressure of 10 psi acts upon the valve element 191, although other suitable opening pressures may be used. When the check valve 185 is opened, a flow path is provided from the secondary passage 51 through the fluted periphery 195 of the valve element 191, through the connecting passageway 189 to the outlet passageway 40. The air passing through the check valve 185 and into the outlet passageway 40 causes a pressure drop. Thus, the outlet 40 is provided with a reduced pressure from the inlet 35 and activates the proportional valve with a reduced air pressure signal, which in turn proportions the output to the brake cylinder with an intermediate ratio. Upon release of the brake application, the air pressure in the actuating chamber 127 is reduced and the retracting spring 150 biases the diaphragm piston assembly 100 back to the position shown in FIG. 5.

Figure 8:
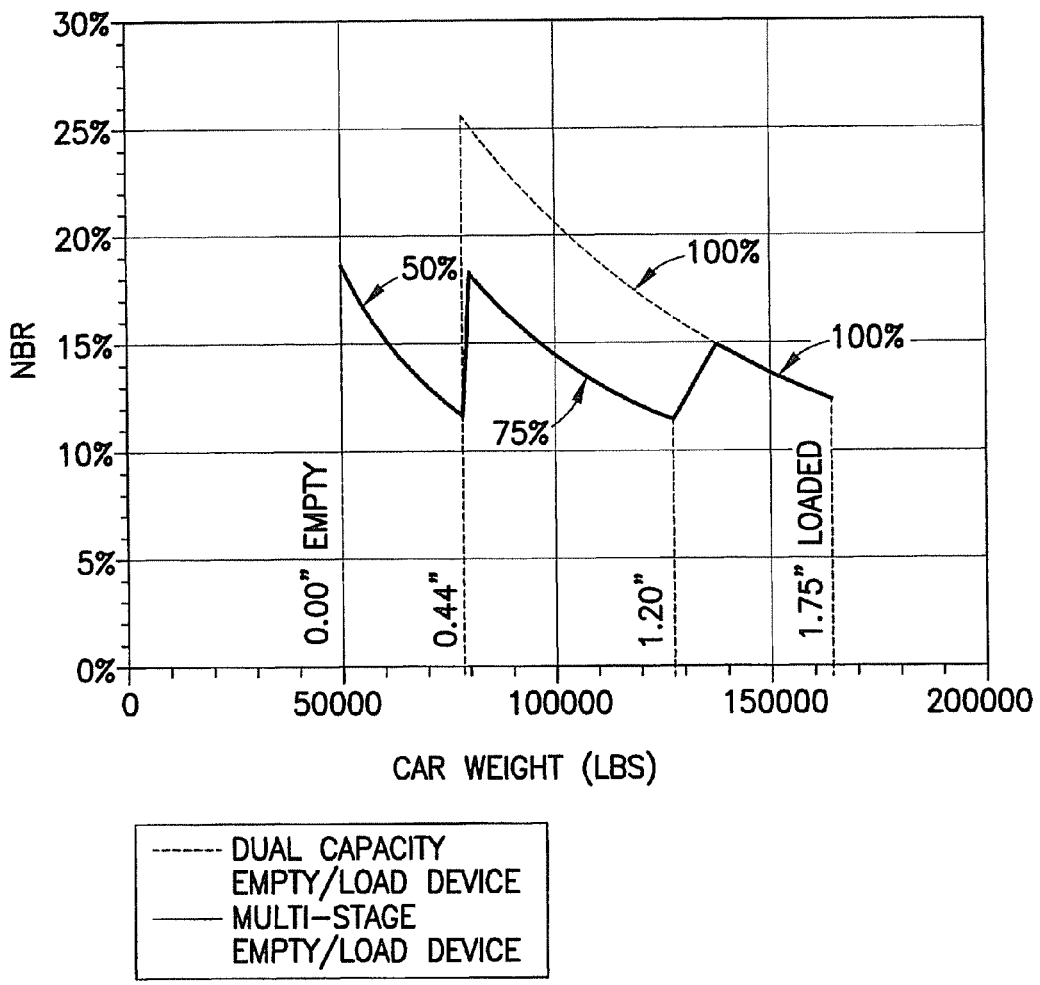
FIG. 8 is a graph showing full service net braking ratio for a range of car weights of a dual capacity empty/load brake control device and the empty/load brake control device shown in FIG. 1.

Referring to FIG. 8, the full service net braking ratio (NBR) for a range of freight car weights for a conventional dual capacity empty/load device and the empty/load device 10 shown in FIGS. 1-7 is disclosed. NBR is the total brake shoe force produced by a car divided by the weight of that car. The graph assumes a 30 psi reduction from 90 psi brake pipe pressure. The air pressure supplied to the brake cylinder for the conventional empty/load valve device (shown in dashed lines) at a car weight of approximately 50,000 lbs is proportioned at a ratio of 50%. As the weight of the car increases, the NBR declines until the changeover point is reached which, in this example, is approximately 80,000 lbs. At the changeover point, the conventional empty/load device is moved to a loaded condition so that the air pressure is delivered to the brake cylinder without any reduction. The NBR using the conventional empty/load device declines up to a point where the car has a maximum weight, which, in this example, is approximately 165,000 lbs. As shown in FIG. 8, the conventional empty/load device is over-braked at the changeover point and has an NBR of approximately 25%. The changeover point for the conventional empty/load device may be designed to occur at a higher car weight, but would result in an under-braked condition before the changeover point is reached.

The air pressure supplied to the brake cylinder for the empty/load device 10 according to one embodiment (shown in solid lines) at a car weight of approximately 50,000 lbs is proportioned at a ratio of 50%. As the weight of the car increases, the NBR declines until the changeover point is reached which, in this embodiment, is approximately 80,000 lbs. At the first changeover point, however, the empty/load device 10 is moved to the partially loaded condition from the empty condition described above so that the air pressure delivered to the brake cylinder is proportioned to a ratio of 75%. Thus, in comparison to the conventional empty/load device, the car is not over-braked or under-braked at the first changeover point and has an NBR of approximately 18%. The NBR of the empty/load device 10 declines until a second changeover point is reached which, in this embodiment, is approximately 130,000 lbs.

At the second changeover point, the empty/load device 10 is moved from the partially load condition to the fully loaded condition as described previously so that the air pressure is delivered to the brake cylinder without any reduction. The NBR using the empty/load valve device of FIGS. 1-7 declines steadily up to a point where the car has a maximum weight, which, in this example, is approximately 165,000 lbs. Approximate displacement values of the sprung portion of the freight car relative to the un-sprung portion of the freight car are also shown in FIG. 8, which correspond to the car weight values. When the car is empty, there will be zero displacement of the sprung portion relative to the un-sprung portion of the car. At the first changeover point, which is approximately 80,000 lbs, the sprung portion will be displaced about 0.44 inches relative to the un-sprung portion of the car. At the second changeover point, which is approximately 130,000 lbs, the sprung portion will be displaced about 1.20 inches relative to the un-sprung portion of the car. When the car is fully loaded, the sprung portion will be displaced about 1.75 inches relative to the un-sprung portion of the car. Accordingly, the empty/load device 10 provides multi-stage sensing to prevent under-braking or over-braking, which can result in decreased braking performance when the freight car is partially loaded and multi-stage sensing of the load is provided by the empty/load device 10.

While certain embodiments of the empty/load device were described in the foregoing detailed description, those skilled in the art may make modifications and alterations to these embodiments without departing from the scope and spirit of the invention. Accordingly, the foregoing description is intended to be illustrative rather than restrictive. The invention described hereinabove is defined by the appended claims and all changes to the invention that fall within the meaning and the range of equivalency of the claims are embraced within their scope.

The invention claimed is:

1. An empty/load brake control device for a railway vehicle comprising:
    a body defining an inlet passageway, an outlet passageway, an exhaust passageway, and a secondary passageway; and
    a valve member disposed within the body, the valve member having an empty position, a load position, and a partial load position,
    wherein the inlet passageway is in fluid communication with the outlet passageway when the valve member is in the empty position, the outlet passageway is in fluid communication with the exhaust passageway when the valve member is in the load position, and the inlet passageway is in fluid communication with the secondary passageway when the valve member is in the partial load position.

2. The empty/load brake control device of claim 1, wherein the valve member is operatively connected to a sensing arm that is pivotal relative to the housing.

3. The empty/load brake control device of claim 2, wherein the empty position, the load position, and the partial load position of the valve member are determined by a pivoted position of the sensing arm.

4. The empty/load brake control device of claim 1, wherein the outlet passageway is in fluid communication with the secondary passageway when the valve member is in the partial load position via a check valve positioned within a valve chamber, the valve chamber in fluid communication with the secondary passageway and the outlet passageway.

5. The empty/load brake control device of claim 4, wherein the valve chamber is in fluid communication with the outlet passageway via a connecting passageway.

6. The empty/load brake control device of claim 4, wherein the check valve comprises a valve element, a valve seat, and a valve spring, the valve seat positioned adjacent the secondary passageway and having a seated position with the valve element engaged with the valve seat and an open position with the valve element spaced from the valve seat.

7. The empty/load brake control device of claim 6, wherein the valve element in the open position provides a flow path from the secondary passageway to the outlet passageway.

8. An empty/load brake control device for a railway vehicle comprising:
    a body defining an inlet passageway, an outlet passageway, an exhaust passageway, and a secondary passageway;
    a valve member disposed within the body, the valve member displaceable between an empty position, a load position, and a partial load position;
    a piston assembly disposed within the body and secured to the valve member, the piston assembly displaceable in a first direction relative to the body;
    a push rod secured to the piston assembly, the push rod displaceable in the first direction relative to the body; and
    a sensing arm secured to the body and the push rod, the sensing arm pivotal relative to the body,
    wherein the piston assembly actuates the valve member between the load position, the partial load position, and the empty position, and wherein the inlet passageway is in fluid communication with the outlet passageway when the valve member is in the empty position, the outlet passageway is in fluid communication with the exhaust passageway when the valve member is in the load position, and the inlet passageway is in fluid communication with the secondary passageway when the valve member is in the partial load position.

9. The empty/load brake control device of claim 8, wherein the outlet passageway is in fluid communication with the secondary passageway when the valve member is in the partial load position via a check valve positioned within a valve chamber, the valve chamber in fluid communication with the secondary passageway and the outlet passageway.

10. The empty/load brake control device of claim 9, wherein the valve chamber is in fluid communication with the outlet passageway via a connecting passageway.

11. The empty/load brake control device of claim 9, wherein the check valve comprises a valve element, a valve seat, and a valve spring, the valve seat being positioned adjacent the secondary passageway and having a seated position with the valve element engaged with the valve seat and an open position with the valve element spaced from the valve seat.

12. The empty/load brake control device of claim 11, wherein the valve element in the open position provides a flow path from the secondary passageway to the outlet passageway.

13. An empty/load brake control device for a railway vehicle comprising:
    a body defining an inlet passageway, an outlet passageway, an exhaust passageway, and a secondary passageway;
    a spool valve having an empty position, a load position, and a partial load position disposed within the body, the spool valve having a spool defining a first annular recess, a second annular recess, an opening in a periphery of the spool, and a central passageway, the first annular recess being defined by first and second seals, the second annular recess being defined by the second seal and a third seal, and the opening in the periphery of the spool connected to the central passageway;

a piston assembly disposed within the body and secured to the valve member, the piston assembly and the spool being displaceable in a first direction relative to the body; and a check valve positioned within a valve chamber, the valve chamber being connected to the secondary passageway and the outlet passageway, wherein the first annular recess of the spool is in fluid communication with the outlet passageway and the exhaust passageway in the load position, the first annular recess of the spool is in fluid communication with the inlet passageway and the outlet passageway in the empty position, and the inlet passageway is in fluid communication with the secondary passageway via the central passageway of the spool in the partial load position.

14. The empty/load brake control device of claim 13, wherein displacement of the piston assembly actuates the spool valve between the load position, the empty position, and the partial load position.

15. The empty/load brake control device of claim 13, further comprising:

a push rod secured to the piston assembly, the push rod being displaceable in the first direction relative to the body; and a sensing arm secured to the body and the push rod, the sensing arm pivotal relative to the body.

16. The empty/load brake control device of claim 15, wherein displacement of the piston assembly pivots the sensing arm.

17. The empty/load brake control device of claim 13, further comprising a retracting spring positioned between the piston assembly and the body.

18. The empty/load brake control device of claim 13, wherein the valve chamber is in fluid communication with the outlet passageway via a connecting passageway.

19. The empty/load brake control device of claim 13, wherein the check valve comprises a valve element, a valve seat, and a valve spring, the valve seat being positioned adjacent the secondary passageway and having a seated position with the valve element engaged with the valve seat and an open position with the valve element spaced from the valve seat.

20. The empty/load brake control device of claim 19, wherein the valve element in the open position provides a flow path from the secondary passageway to the outlet passageway.

* * * * *